(12) United States Patent
Hess et al.

(10) Patent No.: US 9,671,050 B2
(45) Date of Patent: Jun. 6, 2017

(54) CONNECTOR FOR FLUID LINES

(71) Applicant: VOSS Automotive GmbH, Wipperfürth (DE)

(72) Inventors: Jochem-Andreas Hess, Wipperfürth (DE); Andreas Suhr, Lindlar (DE); Frank Zenses, Hürth (DE); Boris Thau, Gevelsberg (DE); Adrian Klehr, Balve (DE)

(73) Assignee: VOSS Automotive GmbH, Wipperfurth (DE)

( * ) Notice: Subject to any disclaimer, the term of this patent is extended or adjusted under 35 U.S.C. 154(b) by 594 days.

(21) Appl. No.: 14/099,350

(22) Filed: Dec. 6, 2013

(65) Prior Publication Data
US 2014/0167410 A1  Jun. 19, 2014

(30) Foreign Application Priority Data

Dec. 7, 2012  (DE) .................... 20 2012 104 769 U

(51) Int. Cl.
*F16L 37/08* (2006.01)
*F16L 37/088* (2006.01)

(52) U.S. Cl.
CPC ............. *F16L 37/08* (2013.01); *F16L 37/088* (2013.01)

(58) Field of Classification Search
CPC ......... F16L 37/08; F16L 37/088; F16L 21/06; F16L 21/02; F16L 21/035
USPC ................. 285/314, 321, 323, 252–254, 374
See application file for complete search history.

(56) References Cited

U.S. PATENT DOCUMENTS

| 4,695,079 A * | 9/1987 | Weinhold ................ F16L 23/06 285/278 |
| 5,090,747 A * | 2/1992 | Kotake ................... F16B 21/16 285/305 |
| 6,361,082 B1 * | 3/2002 | Hauki ................... F16L 33/006 24/279 |
| 7,828,338 B2 * | 11/2010 | Kertesz ............... F16L 37/0987 285/252 |
| 2005/0046185 A1 * | 3/2005 | Olson ................... F16L 37/088 285/321 |

FOREIGN PATENT DOCUMENTS

| WO | 2006/018384 A1 | 2/2006 |
| WO | 2009/156399 A1 | 12/2009 |

* cited by examiner

*Primary Examiner* — Brian Glessner
*Assistant Examiner* — Adam Barlow
(74) *Attorney, Agent, or Firm* — Eric J. Sosenko; Jonathan P. O'Brien; Honigman Miller Schwartz and Cohn LLP

(57) ABSTRACT

The present invention relates to a connector for fluid lines having of a coupling part that can be plugged together with a counter-coupling part along a plug-in axis. A locking device releasably locks the coupling part together with the counter-coupling part. The locking device includes a radially elastically deformable holding element held outside on the coupling part and at least partially encompassing it circumferentially. The holding element interacts with the coupling part, when positioned on the coupling part, via a fixation structure, such that said holding element can optionally be oriented in different relative rotational positions and be fixated in each case to prevent a free, unrestricted rotation about the plug-in axle (X) relative to the coupling part.

22 Claims, 5 Drawing Sheets

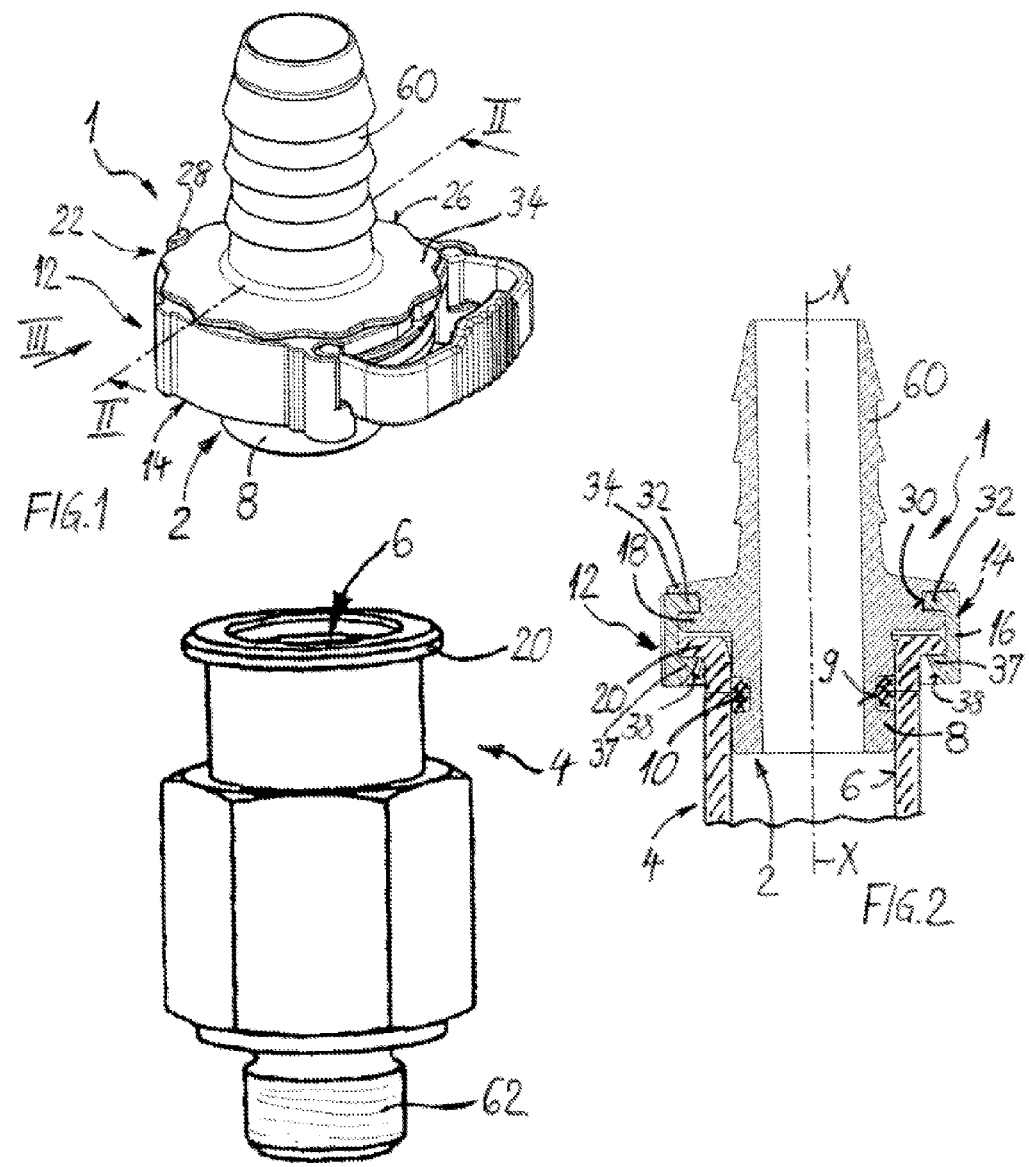

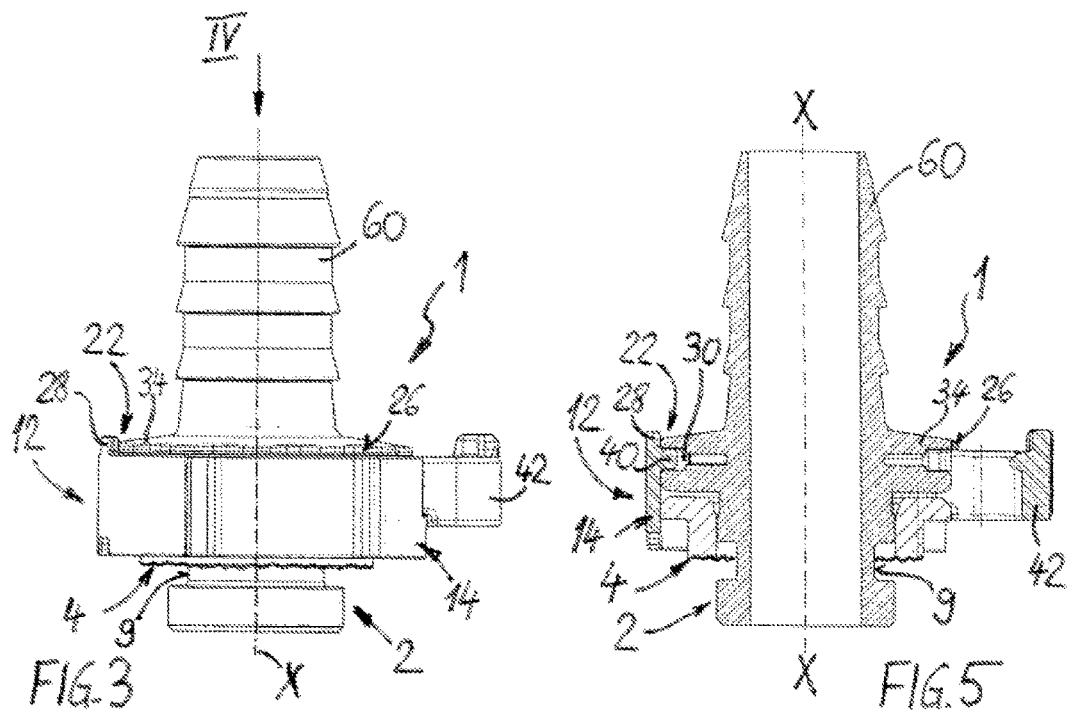
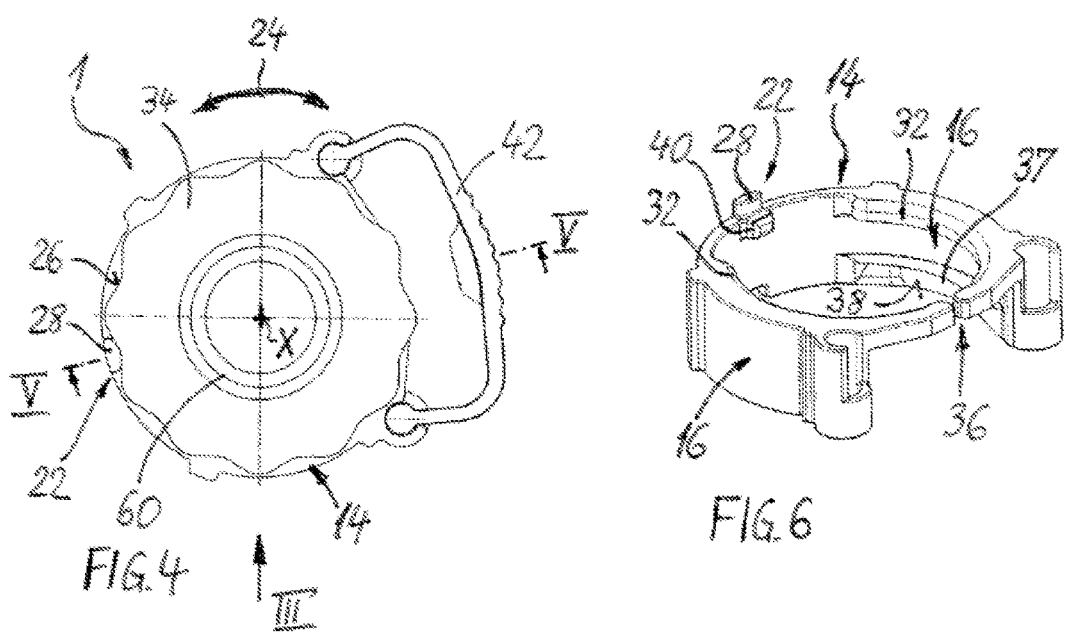

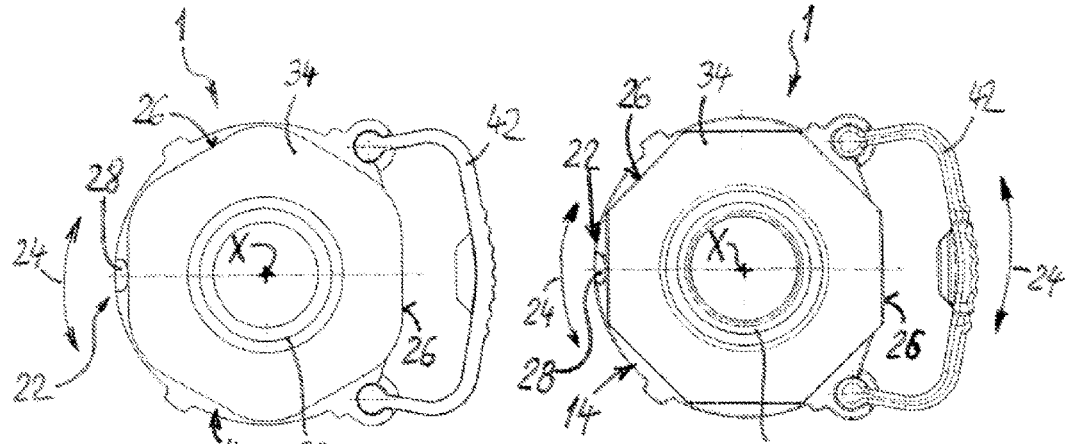
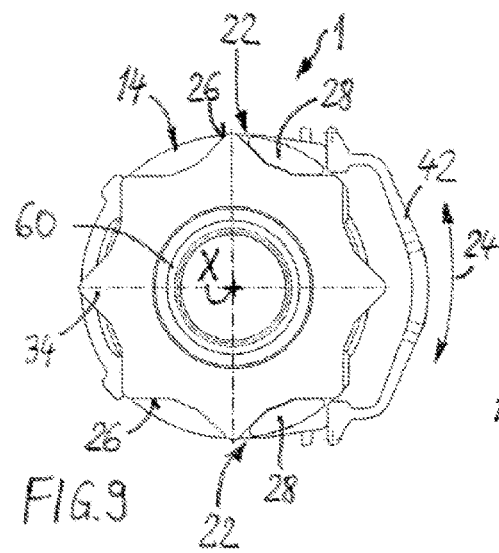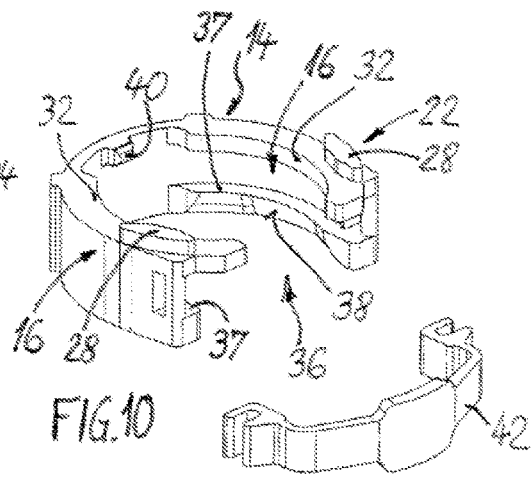

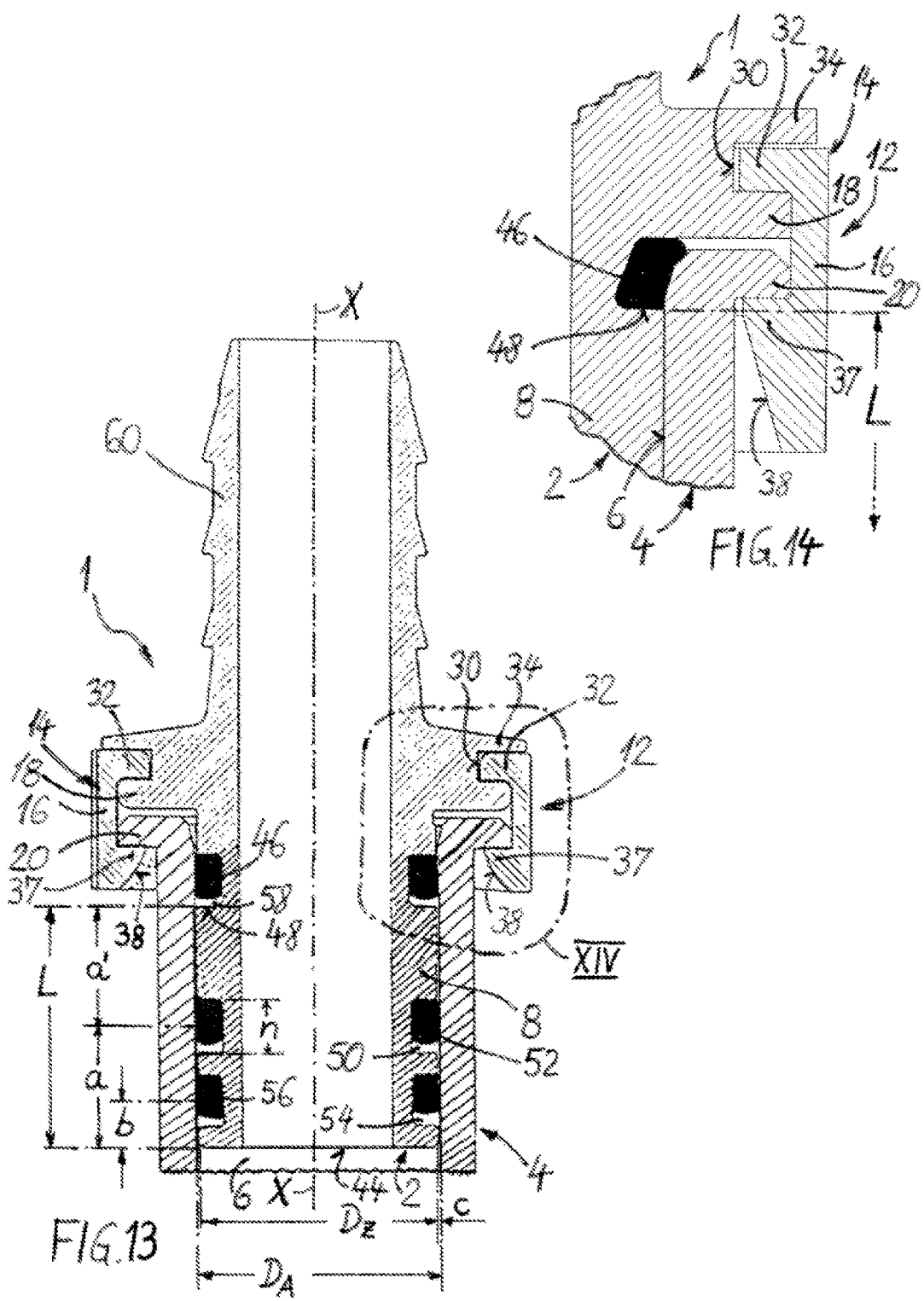

CONNECTOR FOR FLUID LINES

BACKGROUND AND SUMMARY

The present invention generally relates to a connector for fluid lines having a coupling part that can be plugged together with a counter-coupling part in the direction of a plug-in axis, and a locking device for releasably locking the coupling part in the position in which it is plugged together with the counter-coupling part. The locking device is provided as a clamp-like, radially elastic deformable holding element that is held outside the coupling part at least partially encompassing it circumferentially. The holding element radially and axially positively encompassing two outer, radial, flange-like holding bars of the coupling part and of the counter-coupling part with at least one holding segment having a C-shaped axial section in the coupling position.

The invention also generally relates to a connector for fluid lines having a coupling part that can be plugged together with a counter-coupling part in the direction of the plug-in axis, wherein the coupling part is configured as a male plug having a male plug that with the axial contact length can be plugged into a female receptacle of the counter-coupling part configured as a socket part.

A connector of the type described above is, for example, known from each of the documents EP 1 781 979 B1, EP 2 304 302 B1 as well as EP 1 806 528 A1. As a result of the embodiment and captive, meaning secured against loss, pre-assembled mounting of the holding element, the holding element is basically freely rotatable relative to the coupling part. In practice, this can be a disadvantage because collisions with other components can mainly occur where space is restricted in the respective installation places. This basically applies to embodiments, such as those shown in particular in the document EP 2 304 302 B1, for example, in FIGS. 7 and 13, in which the holding element has a section protruding radially relatively far from the coupling part because this section is pivoted in a lever-like manner when the holding element is rotated.

Moreover, in the known connectors, the coupling part configured as a connector part can, by way of example, be tilted or even tipped relative to the plug-in axle inside the female receptacle of the counter-coupling part with pressure pulsations and the resultant vibrations.

The underlying object of the present invention is to improve such a connector in a manner that, when mounted in a restricted installation space, collisions with other, neighboring components can be prevented. Furthermore, the protection against tilting and tipping of the socket part inside the female receptacle is to be improved.

The various features and aspects of the invention can be applied independently of one another, advantageously, however, in combination with one another, wherein all partial features can be provided in any combination of features.

According to a first aspect of the present invention, it is provided that the holding element interacts, when positioned on the coupling part, with fixation means, such that the holding element can optionally be oriented in different relative rotational positions and be fixated in each case to prevent a free, unrestricted rotation about the plug-in axle relative to the coupling part. In this way, the holding element positioned preassembled on the coupling part can be oriented in the rotational direction during or before the plug-in process, such that it can be placed freely and without collisions in the installation area. The holding element can then no longer rotate freely during further operation, rather at most only over a limited rotary angle range, so that collisions with neighboring components are also prevented in that case.

According to another aspect of the present invention, the contact length of the male plug at least corresponds to its outer diameter. Having a longer contact length compared to the state of the art, the male plug is better supported to avoid tilting inside the female receptacle. Combined therewith, at least two axially spaced-apart sealing and/or supporting rings can be arranged on the male plug, wherein a main media seal is preferably arranged in the approximately axial center of the contact length and, thus, in a neutral zone in relation to tilting movements.

BRIEF DESCRIPTION OF THE DRAWINGS

Preferred exemplary embodiments for various aspects of the invention will hereinafter be described in more detail with reference to the drawings, which show:

FIG. 1 is a perspective view of a connector according to the present invention together with the coupling and counter-coupling parts in a separated state prior to plugging together or after separating, FIG. 2 is an axial section generally taken along line II-II of FIG. 1 in the plugged-in and locked state of the coupling and counter-coupling parts, wherein the counter-coupling part is only partially shown, FIG. 3 is a lateral view of the connector in the first embodiment, generally seen in the direction of arrow III in FIG. 1, FIG. 4 is an axial top view in the direction of arrow IV in FIG. 3, FIG. 5 is an axial section generally along line V-V in FIG. 4, FIG. 6 is a separate perspective view of a holding element, as seen in FIGS. 1 to 5, wherein a yoke-like release element has been omitted, FIGS. 7 to 9 are views similar to FIG. 4 in different embodiments, FIG. 10 is a separate exploded perspective view of the holding element with its yoke-like release element according to FIG. 9, FIG. 13 is another enlarged axial section, similar to FIG. 2, of another embodiment according to the present invention and FIG. 14 is an enlarged detail of the area encircled by line XIV in FIG. 13.

DETAILED DESCRIPTION

Figure 11:
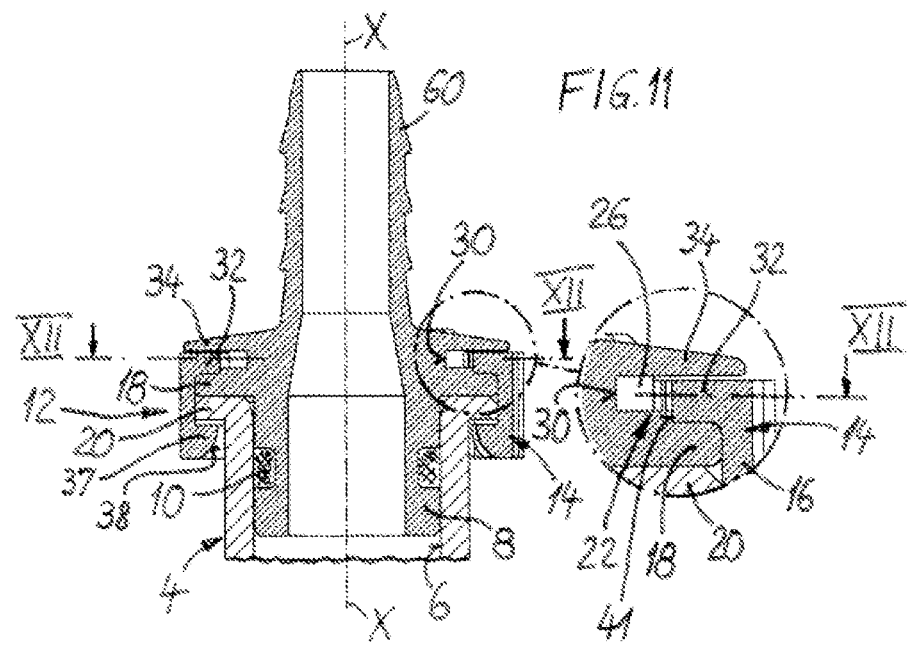
FIG. 11 is an axial section with an enlarged detail of another embodiment of the connector according to the present invention.

Identical parts are always designated with the same reference numerals in the different figures of the drawings.

With respect to the following description, it is explicitly stated that the invention is not restricted to the exemplary embodiments, and thus not to all or several features of the described combinations of features; rather, any individual partial feature of the/of any exemplary embodiment can also be considered to be essential to the invention, independently of all other partial features described in connection therewith, alone and also in combination with any features of another exemplary embodiment, as well as independently of the combinations of features and retroactive application of the claims.

As is apparent from FIG. 1, a connector 1 according to the present invention consists of a coupling part 2 which can be plugged together with a counter-coupling part 4 in the direction of a plug-in axis X—see FIG. 2 in this respect. In the shown preferred embodiments, the coupling part 2 is configured as a connector part having a male plug 8 that can be plugged into a female receptacle 6 of the counter-coupling part 4 configured as a socket part. In order to circumferentially seal the male plug 8 inside the female receptacle 6 having a cylindrical inner surface, the male plug 8 has at least one circumferential seal, in particular in the form of a sealing ring 10 arranged in a circumferential annular groove 9; in this respect, in particular see FIG. 2, and for the annular groove 9 also FIGS. 3 and 5, where the sealing ring 10 is not shown.

The connector 1 furthermore has a locking device 12 for releasably locking the coupling part 2 in the position in which it is plugged together with the counter-coupling part 4, see FIG. 2. The locking device 12 has a clamp-like, radially elastically deformable holding element 14, which is held outside on the coupling part 2, at least partially encompassing it circumferentially. According to FIGS. 2, 11 and 13 it is in this case provided that the holding element 14 positively encompasses, in the radial and axial direction, two outer, radial, flange-like, outwardly protruding holding bars 18 and 20 of the coupling part 2 on the one hand, and the counter-coupling part 4 on the other hand, with at least one holding segment having an axial C-shaped section 16 in the coupling position.

According to the first aspect of the invention, it is in this case provided that, when positioned on the coupling part 2—see the drawings in FIGS. 1, 3 to 5, 7 to 9 as well as 11 and 12 in this respect—the holding element 14 interacts with fixation means 22, with the coupling part 2 such that the holding element 14 can be optionally oriented in different relative rotational positions and be fixated in each rotational position relative to the rotary angle in order to prevent an unrestricted rotation about the plug-in axle X relative to the coupling part 2. The relative rotation and/or rotational orientation of the holding element 14 relative to the coupling part 2 is shown in FIGS. 4, 7 to 9 and 12 by the double arrows 24.

The holding element 14 can basically be positively fixated relative to the coupling part 2 in the direction of the rotation.

In the shown preferred embodiments, the holding element 14 is, however, fixated in a positive force-fitting manner in the direction of rotation with the fixation means 22 such that it can be oriented rotatably and in the different rotational positions relative to the coupling part 2 with stepped latching. For this purpose, the fixation means 22 is formed on the one hand by a circumferential latching contour 26 of the coupling part 2, and on the other hand by at least one latching cam 28 of the holding element 14 interacting with a latching contour 26 configured like a cam track with a circumferential profile that deviates from the standard circular contour. As is apparent from the different exemplary embodiments according to FIGS. 1, 4, 7 to 9, as well as 11 and 12, on interaction with the/each latching cam 28, the fixation means 22 and/or the latching contour 26 can be designed for stepped latching in at least six different rotational positions, in particular at uniformly distributed rotational angles. In the first embodiment according to FIGS. 1 to 6 the latching contour 26 is designed in a wave-like manner for twelve locking positions, so that the holding element 14 can be rotated in a latching manner in steps of 30° each. According to FIG. 7, the latching contour 26 is designed for six different latching positions and thus for rotational steps of 60° each. The embodiments according to FIGS. 8 and 9 are eight different latching rotational positions in rotating steps of 45° each.

Figure 12:
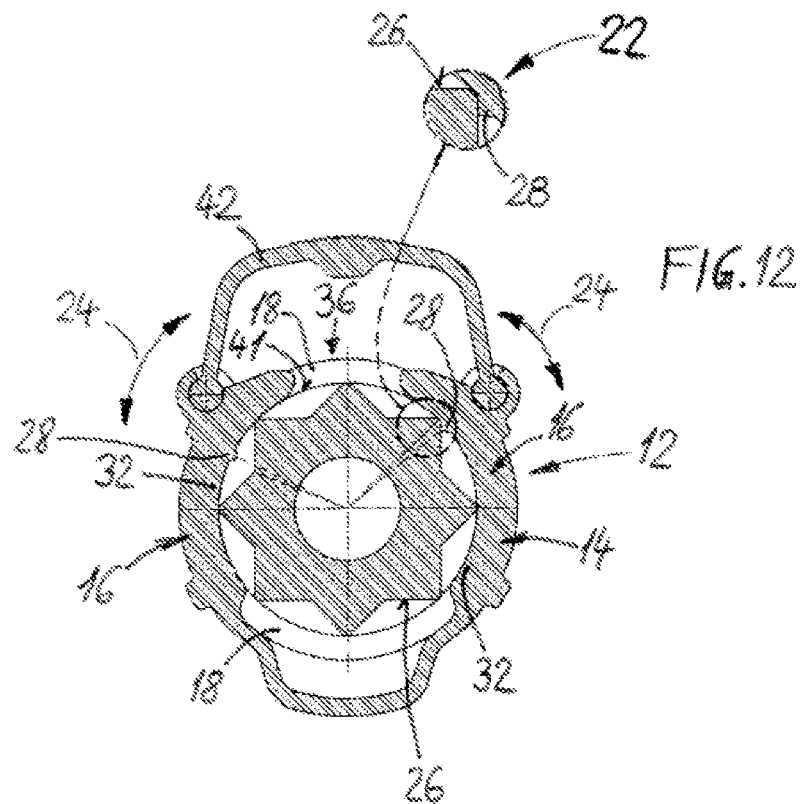
FIG. 12 is a cross-section generally taken along line XII-XII of FIG. 11.

In the embodiment shown in FIGS. 11 and 12, the exemplary star-like latching contour 26 configured with eight latching steps interacts with at least two latching cams 28 of the holding element 14, wherein the latching cams 28 are arranged asymmetrically offset relative to the latching contour 26, such that they each interact individually in different rotational positions of the holding element 14 with one latching step of the latching contour 26; in this respect see FIG. 12. With this embodiment, the number of possible latching rotational positions can be multiplied—in this case doubled—relative to the number of latching steps of the latching contour 26.

It should also be noted that the term "latching position" of the holding element 14 used here is not necessarily to be understood as only one exactly defined angular position, but, as the case may be, as a limited range of rotational movements. The holding element 14 can thus rotate on the coupling part 2, as the case may be, in a defined and consequently limited rotary angle range between two latching positions of up to 45° each, or e.g. 22.5°.

In the shown preferred embodiments, it is furthermore provided that the coupling part 2 has a radial annular groove 30 for the preassembled, captive mount of the holding element 14 in connection to the holding bar 18 to receive corresponding radial collar sections 32 in the region of the C-shaped holding sections 16 of the holding element 14. In this case, the annular groove 30 is formed axially between the holding bar 18 and a fixing ring bar 34. This fixing ring bar 34 axially supports the holding element during the plug-in process.

The holding element 14 is conveniently configured as a one-piece elastic ring clasp which in a peripheral surface area has an axial and radial end-to-end annular interruption 36 for radial elastic deformation (in this respect, see FIGS. 6 and 10), so that basically, two spring-elastic, arcuate latching arms are formed, each of which at least has or forms one of the C-shaped holding sections 16. In this way, this holding element 14 can be mounted or dismantled transversely to the plug-in axle X with elastic expansion.

In the region of the, or of each holding section 16, the holding element 14 furthermore has a holding collar 37 on the side facing the coupling part 4 during the plug-in process with a radial inner slanting surface 38 (in this respect, also see in particular FIG. 6 an 10 as well as FIGS. 2, 11, 13 and 14), such that a radially elastic expansion of the holding element 14 is accomplished when plugging in by contacting the holding bar 20 of the counter-coupling part 4 until the, or each holding section 16 positively engages behind the holding bar 20 with the holding collar 37 in a latching manner. A positive latching connection is thus formed between the coupling parts 2, 4, so that an automatic, self-actuating latch-locking is accomplished. During the plug-in process described above, the mount of the holding element 14 remains on the coupling part 2 while each radial annular collar section 32 remains engaged in the annular groove 30. The annular collar sections 32 and the holding collars 37 have holding surfaces that are axially opposed to one another, which—in alignment with corresponding holding ring surfaces of the holding bars 18, 20 of both coupling parts 2, 4—are designed with an undercut angle greater than/equal to 90° in order to ensure a real form-fit and in consequence high holding and pulling forces.

In the preferred embodiment described above, the circumferential, cam track-like latching contour 26 according to FIGS. 3 to 10 can be formed on the outer periphery of the fixing ring bar 34. For this purpose, the fixing ring bar 34 can be configured as polygonal or star-shaped with rounded corners viewed axially from the top. The latching contour 26 can also have a wave-like profile with radial "mountains and valleys" in the circumferential direction (cf. FIGS. 4 and 9).

In connection with that, in the embodiments according to FIGS. 1 to 8, it is provided that in its area diametrically opposite the annular interruption 36, the holding element 14 has an axially protruding latching cam 28 that abuts against the outer periphery of the fixing ring bar 34 and against the latching contour 26 formed there. In another advantageous embodiment, a guide point 40 is arranged in the region of the latching cam 28, radially engaging the annular groove 30 of the coupling part 2. With the guide point 40, the latching cam 28 is held securely held contacting and engaging the latching contour 26. The guide point 40 is also clearly visible in FIG. 6.

In the alternative embodiment shown in FIGS. 9 and 10, in each of the two regions adjacent to the annular interruption 36, the holding element 14 respectively has one of two axially protruding latching cams 28 that abut against the outer periphery of the fixing ring bar 34 and against the latching contour 26 formed there. In this case, a guide point 40 engaging radially in the annular groove 30 of the coupling part 2 is also arranged in the region diametrically opposite the annular interruption 36, see FIG. 10.

In the embodiment shown in FIGS. 11 and 12 of the connector 1 according to the present invention, the latching contour 26 is formed inside the annular groove 30 between the holding bar 18 and the fixing ring bar 34, namely by a corresponding profile in the region of the groove base of the annular groove 30. The/each latching cam 28 is therefore provided in the interior of the respective annular collar section 32 of the holding element 14 in a radially inward protruding arrangement. A circular guide section 41 is also formed inside the annular groove 30 for rotation and for the release movements of the holding element 14; in particular see the enlarged detail in FIG. 11 as well as in FIG. 12.

In an embodiment variant not shown in the drawings, the latching contour 26 can also be provided on the outer periphery of the holding bar 18, wherein the holding element 14 then has the latching cam or cams 28 in an inner periphery.

In all embodiments, the latching contour 26 can be configured as desired, in particular similarly to one of the examples shown in FIGS. 4, 7 to 9 and 12.

As is furthermore apparent from FIGS. 4, 7 to 10 and 12, in a preferred embodiment, in the region of the annular interruption 36, the holding element 14 has a yoke-like release element 42 bridging said annular interruption 36 such that the holding element 14 can be radially expanded by manually applying pressure in the radial direction to release the coupling part 2. The release element 42 is connected with both ends to the holding element 14 in a specially articulated manner. The release element 42 radially protrudes from the holding element 14, so that the embodiment according to the present invention of the latching rotational orientation is an advantage, in particular because of this protruding release element 42.

The second aspect of the invention addressed in general above will now be described in more detail with FIGS. 11 and 12.

In the coupling part 2 configured as a connector part, the male plug 8 engages with a defined axial contact length L in the female receptacle 6 of the counter-coupling part 4 configured as a socket part. In this case, it is now provided according to the present invention that the contact length L of the male plug 8 corresponds at least to its outer diameter $D_z$. Consequently: $L>D_z$. Nevertheless, in order to have the shortest possible overall length, the contact length L of the male plug 8 should, however, only have a maximum length of 2 to 2.5 times the outer diameter $D_z$. But it preferentially applies that L approximately corresponds to $D_z$, as a result of which an improved tilt resistance as well as a still sufficient short overall length is achieved. In this connection, the term "contact length" L means the axially measured length between a free spigot end 44 of the male plug 8 and a groove flank 48 contacting an outer seal 46, i.e. in or near the mouth of the female receptacle 6 of the counter-coupling part 4. In this respect, reference is made to FIG. 13. The outer seal 46 thus is situated in or near the mouth of the female receptacle 6 of the counter-coupling part 4 in the plugged-in state, also see FIG. 14.

Furthermore, the male plug 8 has—analogously to the sealing ring 10 already described above—a media seal 52 positioned in an annular groove 50. With regard to its axial groove center, the annular groove 50 receiving the media seal 52 is, in this case, spaced apart from the free end 44 of the male plug 8 by an axial distance a which preferably, at maximum, corresponds to half the contact length L, in particular plus/minus half the axial width of the groove n. In an especially advantageous embodiment, a corresponds to half the contact length L, consequently: a=0.5 L. The remaining area of the contact length L between the center of the annular groove 50 and the outer seal 46 and/or of the groove flank 48 has the length a' shown in FIG. 11, wherein a=a' in the preferred embodiment.

In another advantageous embodiment, the male plug 8 has another supporting ring 56 positioned in another annular groove 54 in an area adjacent to the free spigot end 44. In this case it is preferably provided that the annular groove 54 is spaced apart from the free end 44 of the male plug 8 with regard to its axial groove center by a distance b, which corresponds at least to one fifth and at most to one third of the diameter $D_z$ of the male plug 8. Consequently: $\frac{1}{3} D_z \geq b \geq \frac{1}{5} D_z$.

It is furthermore advantageously provided that relative to its outer diameter $D_z$ the male plug 8 is designed as adapted to the female receptacle 6 of the counter-coupling part 4 and its inner diameter $D_A$ such that a radial circumferential clearance has a gap width c of maximally $\frac{1}{100}$ mm. Consequently, here: $c \leq \frac{1}{100}$ mm.

With the described embodiment, increased tilting and tipping resistance of the male plug 8 relative to the plug-in axle X is achieved inside the female receptacle 6 of the counter-coupling part 4. In addition, the media seal 52 is located advantageously in a neutral zone with regard to the still possible tilting movements. This contributes to good sealing properties.

It is furthermore advantageous if the media seal 52 is formed by an O-ring, in particular one made of fluorosilicone caoutchouc, abbreviated designation: FVMQ. This material is characterized by its good resistance to low temperatures down to −40° C. The outer seal 46 can preferably be formed by a sealing ring made of fluoropolymer caoutchouc, abbreviated designation: FKM. This also advantageously applies to the supporting ring 56. FKM is characterized by its good permeation behavior and good chemical stability.

In the embodiment according to FIG. 11 the outer seal 46 is formed by a sealing O-ring with an O-ring deformation that is usual for sealing rings. In this case, the outer seal 46 completely engages in the inner cylindrical surface of the female receptacle 6 and consequently is chambered inside an annular ring 58. In the variant shown in FIG. 12, the outer seal 46 is formed by an O-ring which, in the outer mouth region of the female receptacle 6, establishes a sealing contact with less deformation.

Finally, it should still be mentioned for the sake of completeness that in all embodiments the coupling part 2 and the counter-coupling part 4 can basically have any desired connection elements on their sides opposite the plug connection side. In the shown embodiments, the coupling part 2, preferably configured as a connector part, has a tensioned connector 60 for a fluid line (pipe or hose) that is not shown. The counter-coupling part 4, preferably configured as a socket part, can have a threaded bushing 62. At least one of the coupling parts 2, 4 can of course also be formed in one piece directly on certain aggregates.

The invention is not restricted to the shown and described exemplary embodiments; it also encompasses all embodiments producing a similar effect in the sense of the invention. It is expressly pointed out that the exemplary embodiments have not been restricted to the combination of all features, and thus not to all or several features of described combinations of features, on the contrary, each individual partial feature can also be fundamental to the present invention independently of all other partial features. Furthermore, the invention has as yet not even been restricted to the combination of features defined in the respective independent claims; it can also be defined by any other combination of certain features of all disclosed individual features. This fundamentally means, in practical terms, that each individual feature of the respective independent claims may be omitted and/or replaced by at least one individual feature disclosed at another point in the application. In this respect, the claims are merely to be understood as a first attempt at formulating the invention.

The invention claimed is:

1. A connector for fluid lines comprising a coupling part and a counter-coupling part that can be plugged together in a plug-in axis (X), a locking device that releasably locks the coupling part in a position in which it is plugged together with the counter-coupling part, the locking device including a radially elastically deformable holding element held outside on the coupling part and at least partially encompassing the coupling part circumferentially, wherein the holding element radially and axially positively encompasses two outer, radial, holding bars of the coupling part and of the counter-coupling part with at least one holding section having an axial C-shaped section when in the coupling position, the holding element, when positioned on the coupling part, being engaged with the coupling part by way of a fixation structure such that the holding element can be oriented in different relative rotational positions and be fixated in each of the rotational positions to prevent a free, unrestricted rotation of the holding element relative to the coupling part about the plug-in axis (X), the holding element being fixated in the different rotational positions against free, unrestricted rotation by positive force and stepped latching engagement of the fixation structure, the fixation structure including a circumferential latching contour of the coupling part and at least one latching cam of the holding element, the circumferential latching contour defining steps about the coupling part and corresponding to the different rotational positions, the latching cam engaging with the latching contour at the steps in the positive force and stepped latching engagement.

2. The connector according to claim 1, wherein the fixation structure defines at least six rotational positions of uniform angular distribution about the coupling part.

3. The connector according to claim 1, wherein for mounting the holding element to the holding bar the coupling part includes an annular groove which in are received corresponding annular collar sections of the holding element, wherein the annular groove is formed axially between the holding bar and a fixing ring bar on the coupling part.

4. The connector according to claim 3, wherein the holding element is configured as a one-piece elastic ring clasp which has an end-to-end annular interruption in order to be radially elastically deformable, wherein the holding element can be assembled and disassembled transversely to the plug-in axis (X) by elastic expansion.

5. The connector according to claim 1, wherein the holding element includes a radial inner slanting surface on a side of a holding section facing the counter-coupling part during the plug-in process, such that a radially elastic expansion of the holding element is accomplished when plugging in by contacting the holding bar of the counter-coupling part until the at least one holding section positively snaps in behind the holding bar.

6. The connector according to claim 4, wherein the circumferential latching contour is formed at the outer periphery of the fixing ring bar.

7. The connector according to claim 6, wherein the circumferential latching contour of the fixing ring bar is one of polygonal or star-shaped.

8. The connector according to claim 6, wherein in an area diametrically opposite the annular interruption, the holding element includes the latching cam which protrudes axially and abuts against the outer periphery of the fixing ring bar and against the latching contour formed there, wherein a guide point is arranged in the region of the latching cam and radially engages in the annular groove of the coupling part.

9. The connector according to claim 4, wherein the holding element includes in each of two regions adjacent to the annular interruption the latching cam which axially protrudes abutting against the outer periphery of the fixing ring bar and against the latching contour formed there, wherein a guide point is arranged in the region diametrically opposite of the annular interruption and radially engages in the annular groove of the coupling part.

10. The connector according to claim 6, wherein the circumferential latching contour is formed inside the annular groove between the holding bar and the fixating ring bar, wherein the holding element has at least one latching cam protruding radially inward on at least one of the annular collar sections.

11. The connector according to claim 6, wherein the circumferential latching contour is formed on the outer periphery of the holding bar.

12. The connector according to claim 4, wherein, in the region of the annular interruption, the holding element includes a release element bridging the annular interruption such that the holding element can be radially expanded by manually applying pressure in the radial direction to release the coupling part.

13. The connector according to claim 1, wherein the coupling part includes a male plug configured as a connector part that is received into a female receptacle configured as a socket part of the counter-coupling part.

14. The connector according to claim 13, wherein the connector part has an axial contact length (L) that is plugged into the female receptacle configured as the socket part of the counter-coupling part, wherein the contact length (L) of the male plug is at least equal to an outer diameter (Dz) of the male plug.

15. The connector according to claim 14, wherein the contact length (L) of the male plug has a maximum length in the range of 2 to 2.5 times greater than the outer diameter (Dz).

16. The connector according to claim 14, wherein the contact length (L) is defined as a axial length between a free spigot end of the male plug and a groove flank adjacent to an outer seal, wherein the outer seal is provided near a mouth of the female receptacle of the counter-coupling part when plugged together.

17. The connector according to claim 14, wherein the male plug carries a media seal positioned in an annular groove, the annular groove being spaced apart from a free end of the male plug relative to an axial center of the annular groove by an axial distance (a), the axial distance (a) being not greater than half the contact length (L) plus half an axial groove width (n) of the annular groove.

18. The connector according to claim 17, where in a region adjacent to the free spigot end, the male plug-carries a supporting ring positioned in an annular groove, wherein the annular groove is spaced apart from the free end of the male plug relative to an axial groove center by an axial distance (b), axial distance (b) being in the range of one fifth to one third of the diameter (Dz) of the male plug.

19. The connector according to claim 14, wherein the outer diameter (Dz) the male plug defines a radial circumferential clearance with a maximum gap width (c) of $\frac{1}{100}$ mm relative to an inner diameter of the female receptacle.

20. The connector according to claim 17, wherein the media seal is formed by an O-ring made of fluorosilicone caoutchouc (FVMQ).

21. The connector according to claim 16, wherein the outer seal is formed by a sealing ring made of fluoropolymer caoutchouc (FKM).

22. The connector according to claim 18, wherein the supporting ring is a sealing ring made of fluoropolymer caoutchouc (FKM).

* * * * *